(12) United States Patent
Aller

(10) Patent No.: US 8,414,056 B1
(45) Date of Patent: Apr. 9, 2013

(54) AUTOMOTIVE VEHICLE SECOND ROW RECONFIGURABLE SEAT

(75) Inventor: David M. Aller, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/438,214

(22) Filed: Apr. 3, 2012

(51) Int. Cl.
*B60N 2/32* (2006.01)
(52) U.S. Cl. .................................................. 296/69
(58) Field of Classification Search .............. 296/63, 296/65.01, 66, 69
See application file for complete search history.

(56) References Cited

U.S. PATENT DOCUMENTS

| 1,233,957 | A  | * | 7/1917 | Anglada | 296/66 |
| 1,415,209 | A  | * | 5/1922 | Troke | 296/63 |
| 6,406,084 | B1 | * | 6/2002 | de Campos et al. | 296/66 |
| 6,568,736 | B2 | * | 5/2003 | Jach et al. | 296/65.09 |
| 6,679,536 | B1 | * | 1/2004 | Sonnenberg et al. | 296/65.09 |
| 7,367,624 | B2 | * | 5/2008 | Garland | 297/362.11 |

* cited by examiner

*Primary Examiner* — Lori Lyjak
(74) *Attorney, Agent, or Firm* — Quinn Law Group, PLLC

(57) ABSTRACT

A vehicle includes a rear deck lid and a rear vehicle seat having a seat portion and a back portion. The back portion of the rear vehicle seat is configured to slide between a first, seating position and a second, intermediate position, and is further configured to articulate between the second, intermediate position and a third, tonneau cover position. When in the third, tonneau cover position, the back portion of the rear vehicle seat is substantially aligned with the rear deck lid, and extends toward a front seat of the vehicle.

17 Claims, 4 Drawing Sheets

AUTOMOTIVE VEHICLE SECOND ROW RECONFIGURABLE SEAT

TECHNICAL FIELD

The present invention relates to a second row automotive vehicle seating technology for convertible-style automobiles.

BACKGROUND

Many convertible-style automobiles are manufactured in four-seater configurations with two front seats, and at least two rear seats. While this is a desirable seating arrangement, certain aftermarket part suppliers manufacture tonneau covers (also referred to as speedster covers) to selectively extend the rear deck lid of the vehicle to the front seats. This modified two-seater vehicle profile typically results in a vehicle appearance that may be perceived as more aggressive or sporty. These aftermarket covers, however, can be difficult to install, may require separate storage if removed, and/or may interfere with the ability of the vehicle owner to put the vehicle top up.

SUMMARY

A vehicle includes a rear deck lid and a rear vehicle seat having a seat portion and a back portion, and a front seat. The back portion of the rear vehicle seat is configured to selectively transition between a seating position and a tonneau cover position. When in the tonneau cover position, the back portion of the rear vehicle seat may be substantially aligned with the rear deck lid, and may extend the deck lid toward the front seat of the vehicle.

In one configuration, the back portion of the rear vehicle seat may transition from the seating position to the tonneau cover position by sliding to an intermediate position, and then by articulating into the tonneau cover position. The back portion of the rear vehicle seat may be disposed at a seat angle relative to the seat portion when in both the seating position and in the intermediate position.

The back portion of the rear vehicle seat may include a body panel and a cushion disposed opposite the body panel. The cushion side of the rear seat back may substantially face the seat portion of the rear vehicle seat when in the tonneau cover position. As such, the cushion side of the rear seat back, the front seat, and the seat portion of the rear vehicle seat may partially define a rear-seat storage area, which may be selectively lockable by a user.

The above features and advantages and other features and advantages of the present invention are readily apparent from the following detailed description of the best modes for carrying out the invention when taken in connection with the accompanying drawings.

DETAILED DESCRIPTION

Figure 1:
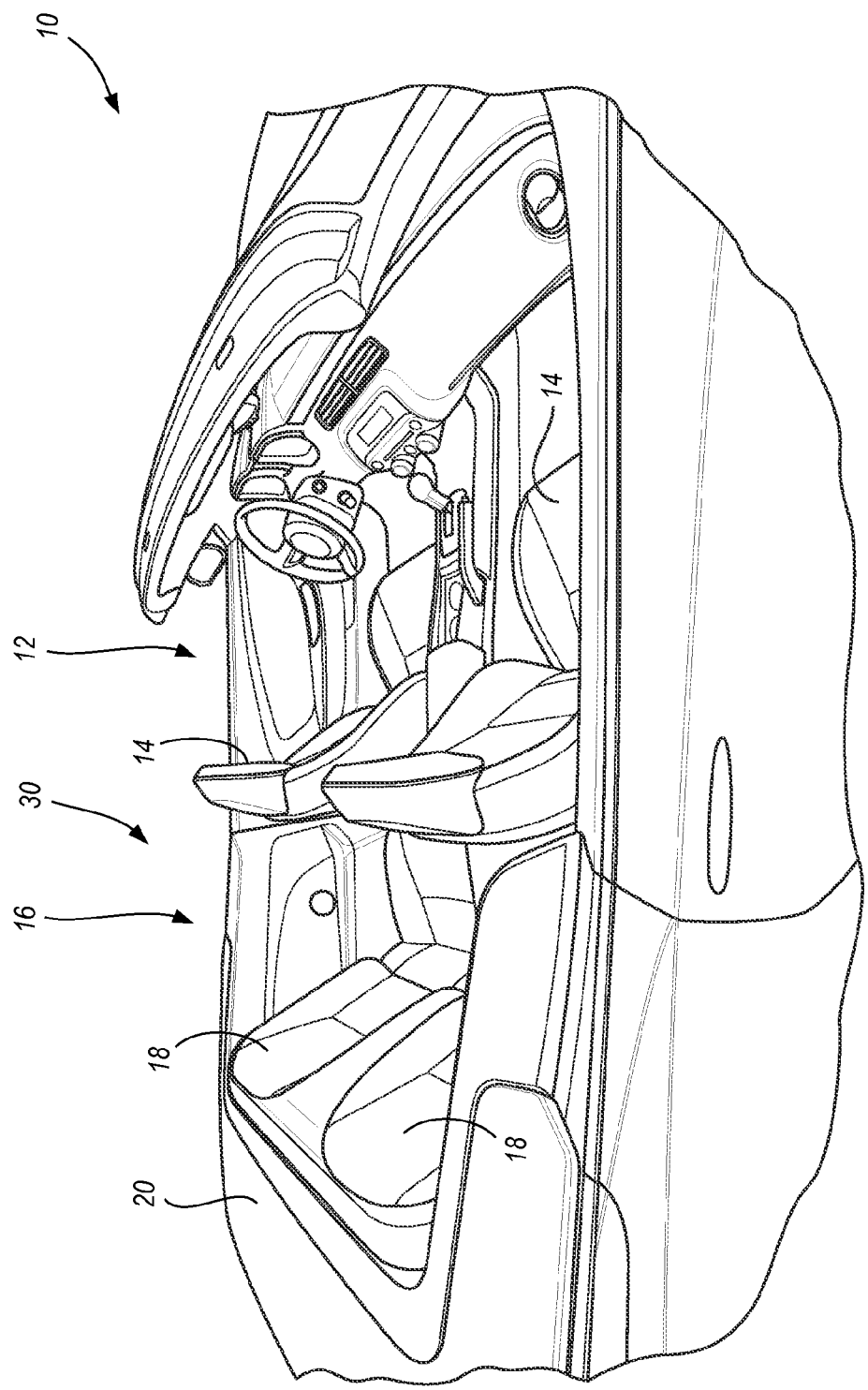
FIG. 1 is a schematic perspective view of a convertible-style automotive vehicle.

Referring to the drawings, wherein like reference numerals are used to identify like or identical components in the various views, FIG. 1 schematically illustrates an automotive vehicle 10 including a first seating row 12 with one or more front seats 14, a second seating row 16 with one or more rear seats 18, and a rear deck lid 20. As illustrated, the automotive vehicle 10 may be a convertible-style vehicle, where the roof of the vehicle 10 may retract into a storage area beneath the rear deck lid 20.

Figure 2:
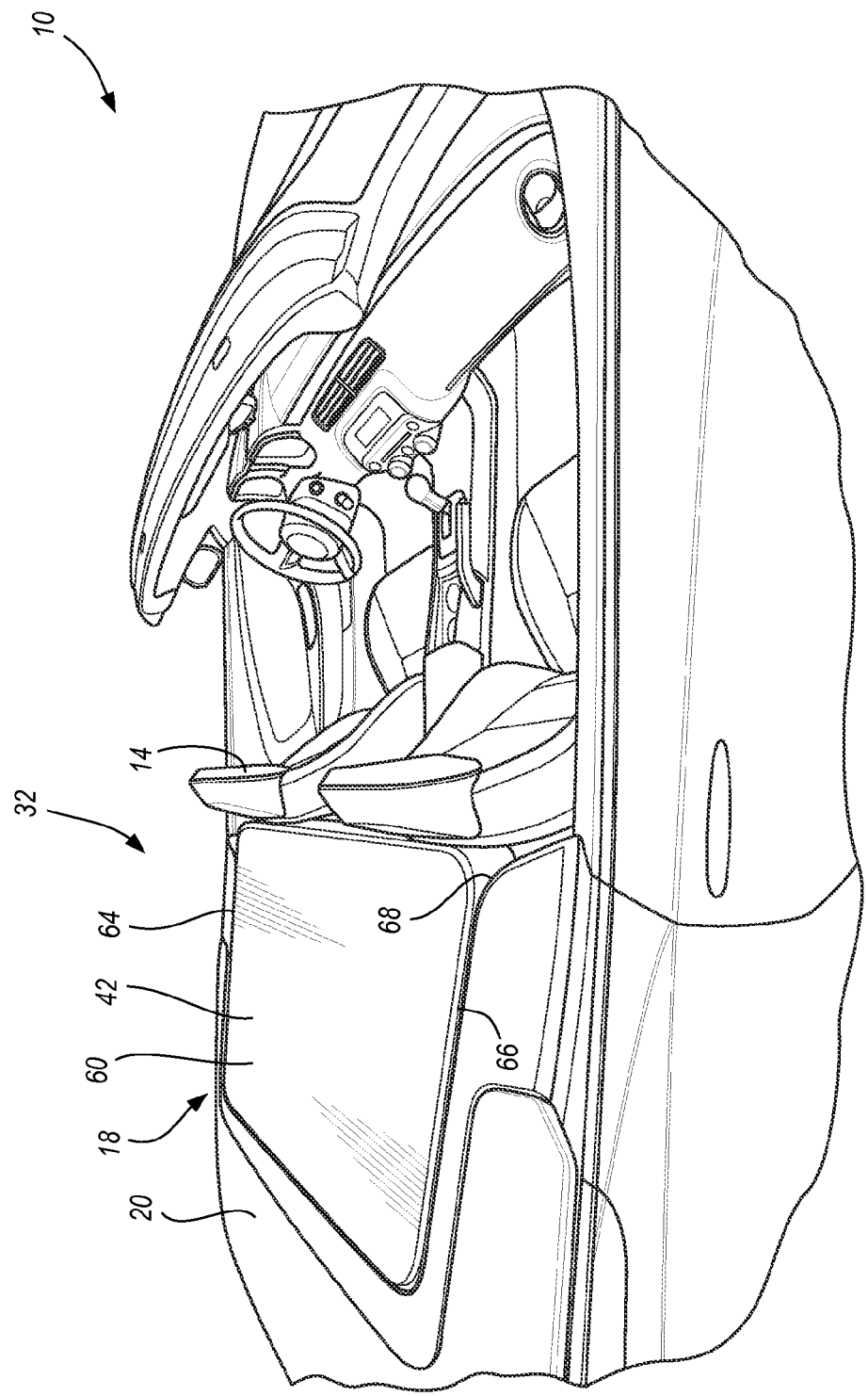
FIG. 2 is a schematic perspective view of the vehicle provided in FIG. 1, with a portion of the rear seat disposed in a tonneau cover configuration.
Figure 3A:
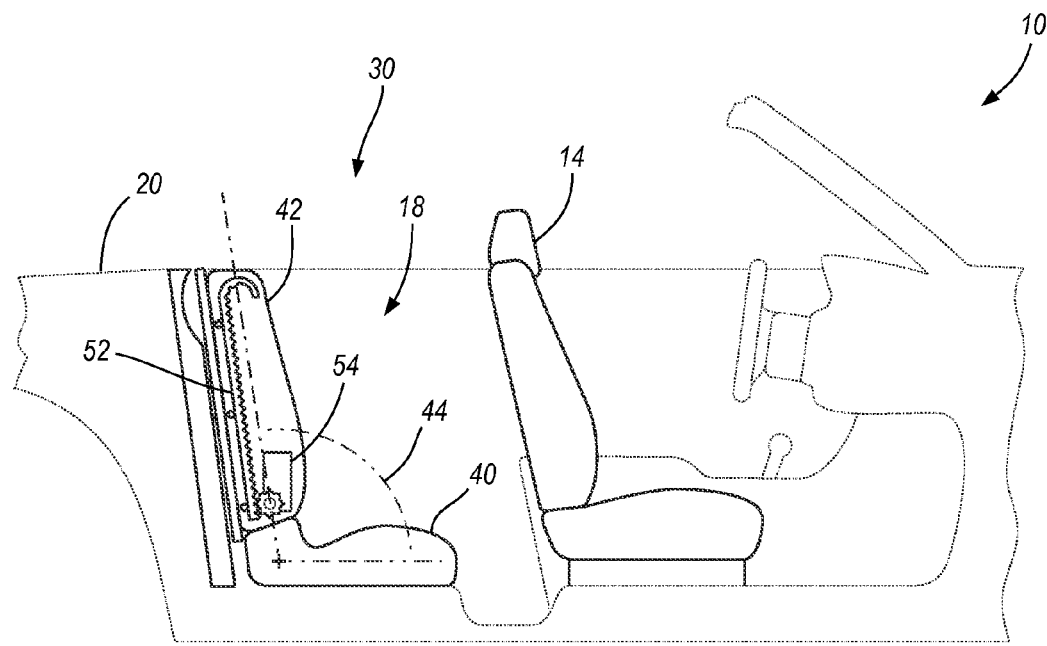
FIG. 3A is a schematic side view of the vehicle provided in FIG. 1, with the back portion of the rear vehicle seat disposed in a seating position.
Figure 3B:
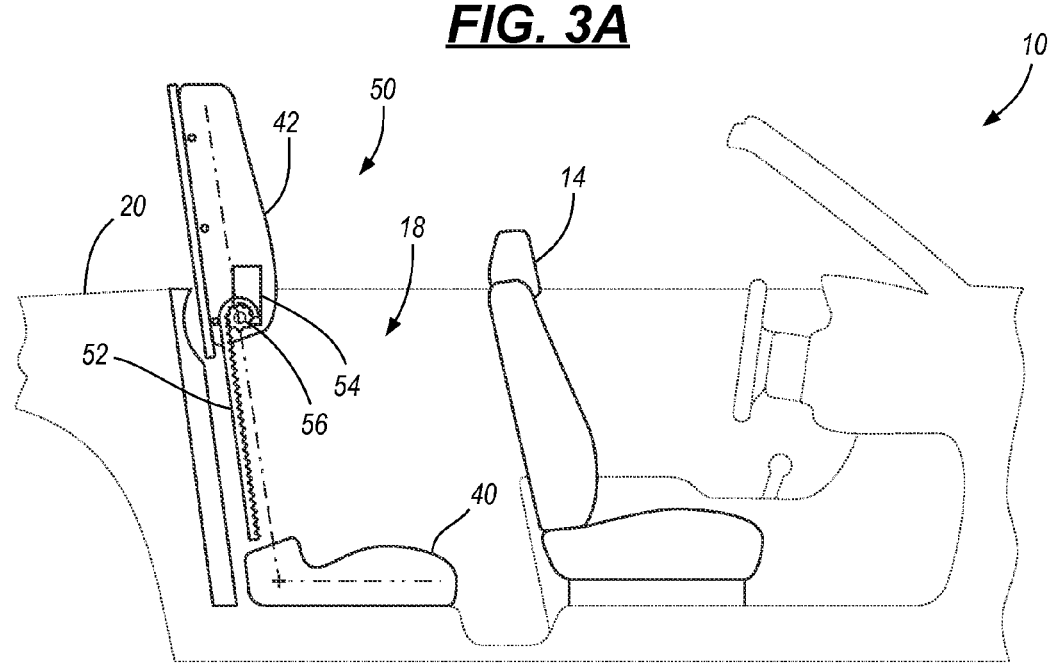
FIG. 3B is a schematic side view of the vehicle provided in FIG. 1, with the back portion of the rear vehicle seat disposed in an intermediate position.
Figure 3C:
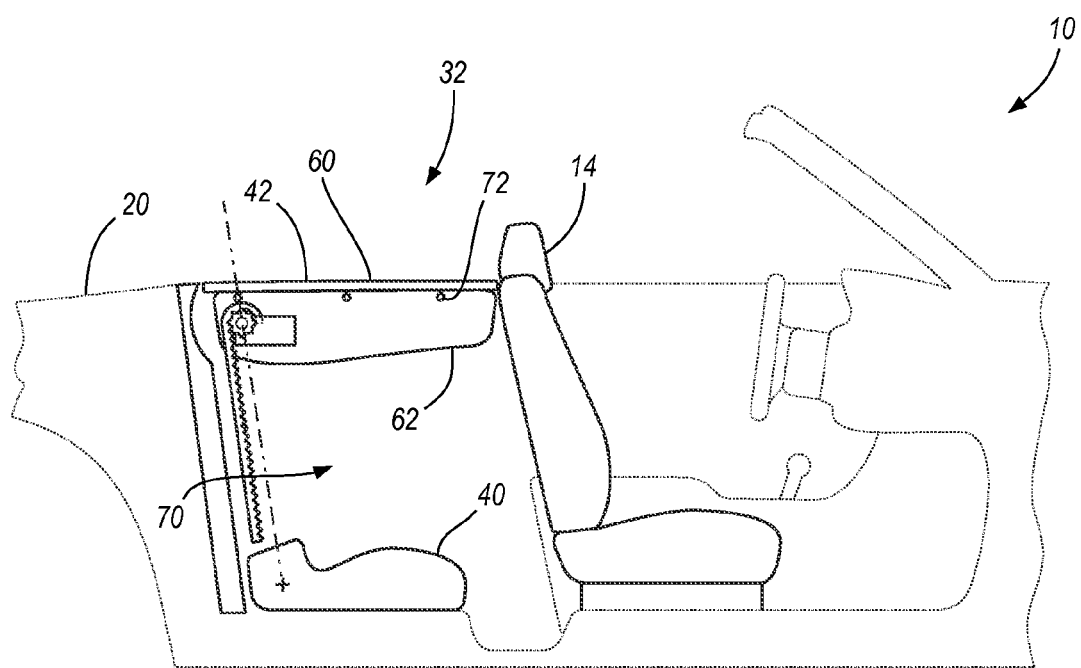
FIG. 3C is a schematic side view of the vehicle provided in FIG. 1, with the back portion of the rear vehicle seat disposed in a tonneau cover position.

In one configuration, a portion of the rear seat 18 may selectively transition from a seating configuration 30, such as illustrated in FIG. 1, to a tonneau cover configuration 32, such as illustrated in FIG. 2. This transition may be desirable to a user for both aesthetic purposes (e.g., to change the look of the vehicle 10 from a four-seater vehicle to a two-seater roadster) while also providing additional storage space. FIGS. 3A, 3B, and 3C schematically illustrate a side view of the vehicle seating arrangement during such a transition.

As generally illustrated in FIG. 3A, the rear seat 18 may include both a seat portion 40 (i.e., a "rear seat bottom 40") and a back portion 42 (i.e., a "rear seat back 42"). When in a seating configuration 30, such as generally illustrated in FIG. 3A, the back portion 42 of the rear seat 18 may be disposed at a seating angle 44 relative to the seat portion 40 (i.e., a rear seating angle 44). In this configuration 30, the rear seat 18 may be particularly suited to receive a seated occupant.

As generally illustrated in the sequence provided in FIGS. 3A, 3B, and 3C, the rear vehicle seat 18 may convert from a seating configuration 30 (i.e., FIG. 3A) to a tonneau cover configuration 32 (i.e., FIG. 3C) through physical movement of the back portion 42 of the rear vehicle seat 18. For example, the back portion 42 may initially slide between a first, seating position/configuration 32 (i.e., FIG. 3A) and a second, intermediate position 50 (FIG. 3B). While sliding, the back portion 42 may remain substantially aligned at the rear seating angle 44. One or more tracks or guides 52 may be provided to facilitate the controlled translation of the seat back 42.

The rear seat back 42 may be operative to slide into the intermediate position 50 (FIG. 3B) under the power, or with the assist of an actuator 54. The actuator 54 may include, for example, a telescoping linear actuator, a screw drive, a gear drive, a rack and pinion arrangement, a pulley mechanism, and/or some other form of an extension mechanism as may be known in the art. The actuator 54 may be electrically operated, and may translate the back portion 42 of the seat 18 into the intermediate position 50, for example, at the direction of an electronic controller. In one configuration, the controller may urge the actuator 54 to translate the rear seat back 42 following the depressing of a button, or toggling of a switch by a user.

Once the rear seat back 42 arrives in the intermediate position 50, such as shown in FIG. 3B, it may then articulate into the tonneau cover position/configuration 32, as shown in FIG. 3C. In one embodiment, the articulation may be about a pivot point 56 and may be effected by the actuator 54 that was responsible for the translation between the seating position 30 and the intermediate position 50. In another configuration, either a separate actuator may be employed to perform the articulation, or the articulation may be manually performed by the operator.

While in the tonneau cover position 32 (FIGS. 2 and 3C), the back portion 42 of the rear vehicle seat 18 may be substantially aligned with the rear deck lid 20. In this manner, the rear seat back 42 may operatively extend the rear deck lid 20 toward the front seat 14. This may change the personality and appearance of the vehicle from a four seater convertible, to a more aggressively styled two-seater roadster. To further aid this visual transition, the rear seat back 42 may include one or more body panels 60 opposite the seat cushion 62. When in a tonneau cover position 32, the body panel 60 may be visible from the exterior of the vehicle 10, and may abut the decklid 20. The body panel 60 may likewise be styled in a manner similar to the decklid 20 or other body panels of the vehicle 10. For example, the body panel 60 may be painted with a similar color as the general vehicle exterior, and may have a similar surface finish as the general vehicle exterior.

In one configuration, the rear seat back 42 may directly contact the front seat 14 without any intervening components. To provide enhanced support while in the tonneau cover position 32, however, opposing sides 64, 66 of the rear seat back 42 may rest against portions of the vehicle body 68. Additionally, close out panels or other trim pieces may be employed near the perimeter of the body panel 60 to create a clean and gap-free appearance.

As further illustrated in FIG. 3C, when in the tonneau cover position 32, the cushion side 62 of the back portion 42 may substantially face the seat portion 40 of the rear vehicle seat 18. As such, the cushion side 62 of the rear seat back 42, the front seat 14, and the seat portion 40 of the rear vehicle seat 40 may partially define a rear-seat storage area 70. The rear-seat storage area 70 may provide vehicle occupants with additional storage beyond what is provided by the standard vehicle trunk. This may be beneficial to occupants for at least the reason that, in a convertible, the standard vehicle trunk is largely occupied by the roof of the vehicle 10 when in a top-down configuration. The rear-seat storage area 70 may provide sufficient storage for groceries, two or more golf bags, and/or other vehicle cargo.

To secure the rear-seat storage area 70, the seat back 42 of the rear vehicle seat may be configured to selectively lock in the tonneau cover position 32, such as by latching a striker 72 within a locking mechanism integrated into the vehicle body. In one configuration, the striker 72 may additionally be configured to ride along a track or guide 52 while sliding into the intermediate position 50. In a different configuration, the locking mechanism may be integrated into the pivot point 56, such as through a structural locking pawl that may prevent unintended opening of the rear-seat storage area 70. By selectively locking the back portion 42 of the rear vehicle seat 18 in the tonneau cover position 32, the rear-seat storage area 70 may secure occupant cargo when the vehicle roof is down. Additionally, with the rear seat back 42 in the tonneau cover position 32, occupant cargo within the rear-seat storage area 70 may be out of sight from passing pedestrians.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A vehicle comprising:
    a rear deck lid;
    a rear vehicle seat including a seat portion and a back portion;
    wherein the back portion of the rear vehicle seat is configured to slide between a first, seating position and a second, intermediate position, and is further configured to articulate between the second, intermediate position and a third, tonneau cover position; and
    wherein the back portion of the rear vehicle seat is substantially aligned with the rear deck lid when in the third, tonneau cover position.

2. The vehicle of claim 1, wherein the back portion of the rear vehicle seat is disposed at a seat angle relative to the seat portion when in both the seating position and in the intermediate position.

3. The vehicle of claim 1, further comprising a front seat; and
    wherein the back portion of the rear vehicle seat is substantially aligned with the rear deck lid when in the tonneau cover position and operatively extends the rear deck lid toward the front seat when in the tonneau cover position.

4. The vehicle of claim 3, wherein the back portion of the rear vehicle seat includes a body panel side and a cushion side disposed opposite the body panel side; and
    wherein the cushion side of the back portion substantially faces the seat portion of the rear vehicle seat when in the tonneau cover position.

5. The vehicle of claim 4, wherein the cushion side of the back portion, the front seat, and the seat portion of the rear vehicle seat partially define a rear-seat storage area.

6. The vehicle of claim 5, wherein the back portion of the rear vehicle seat is selectively lockable in the tonneau cover position.

7. The vehicle of claim 3, wherein the rear vehicle seat is operative to receive a seated occupant when the back portion of the rear vehicle seat is in the seating position.

8. A vehicle comprising:
    a front seat;
    a rear deck lid; and
    a rear seat disposed between the front seat and the rear deck lid, the rear seat including a seat portion and a back portion;
    wherein the back portion of the rear seat is selectively transitionable between a seating position and a tonneau cover position; and
    wherein the back portion of the rear seat is substantially aligned with the rear deck lid and extends between the rear deck lid and the front seat when in the tonneau cover position.

9. The vehicle of claim 8, wherein the rear seat is configured to receive a seated occupant when the back portion of the rear seat is in the seating position; and
    wherein the back portion of the rear seat and the seat portion of the rear seat partially define a rear-seat storage area when the back portion of the rear seat is in the tonneau cover position.

10. A vehicle comprising:
    a guide fixed relative to the vehicle and having a longitudinal axis disposed along a seat back angle;
    a rear seat back in communication with the guide, wherein the rear seat back is pivotable with respect to the guide and translatable along the longitudinal axis of the guide;
    wherein the rear seat back is configured to translate along the longitudinal axis of the guide between a first, seating position and a second, intermediate position; and
    wherein the rear seat back is configured to pivot relative to the guide between the second, intermediate position and a third, tonneau cover position.

11. The vehicle of claim 10, further comprising:
    a rear deck lid; and wherein the rear seat back operatively extends the rear deck lid when in the tonneau cover position.

12. The vehicle of claim 10, further comprising:
a rear seat bottom; and
wherein the rear seat back and rear seat bottom are configured to receive a seated occupant when the rear seat back is in the seating position.

13. The vehicle of claim 12, wherein the seat back angle is defined relative to the rear seat bottom.

14. The vehicle of claim 12, wherein the rear seat back and the rear seat bottom partially define a rear-seat storage area when the rear seat back is in the tonneau cover position.

15. The vehicle of claim 14, wherein the rear seat back is selectively lockable in the tonneau cover position.

16. The vehicle of claim 10, wherein the rear seat back is constrained from relative rotation while between the seating position and the intermediate position.

17. The vehicle of claim 10, further comprising an actuator configured to translate the rear seat back between the seating position and the intermediate position.

* * * * *